Figure 1:
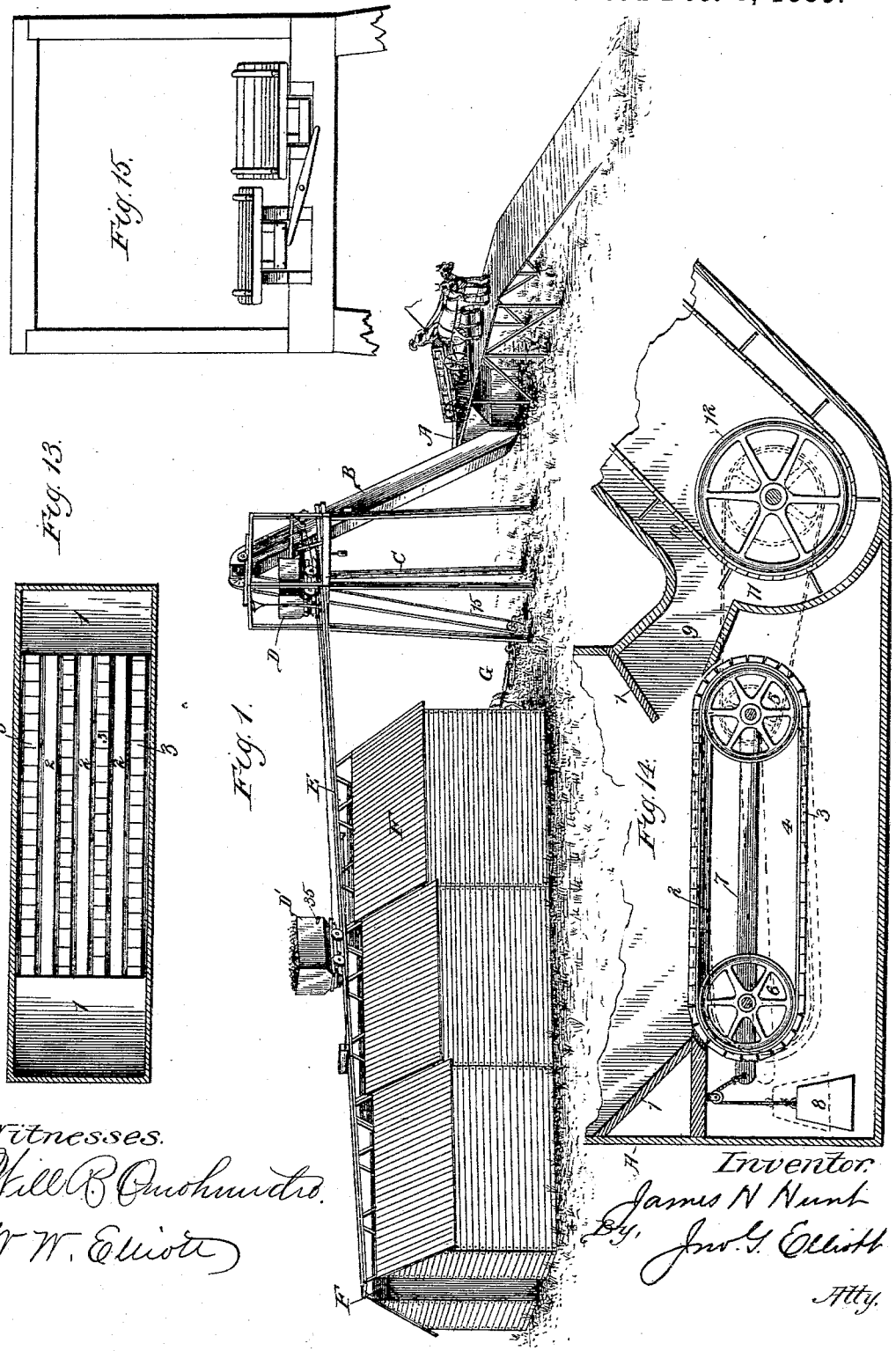

(No Model.)  7 Sheets—Sheet 2.

J. H. HUNT.
COMBINED ELEVATOR AND DISTRIBUTER.

No. 331,884. Patented Dec. 8, 1885.

Witnesses.
Will R. Onehundred
W. W. Elliott

Inventor:
James H. Hunt
By Jno. G. Elliott
Atty.

N. PETERS, Photo-Lithographer, Washington, D. C.

(No Model.)  7 Sheets—Sheet 4.

J. H. HUNT.
COMBINED ELEVATOR AND DISTRIBUTER.

No. 331,884.  Patented Dec. 8, 1885.

(No Model.) 7 Sheets—Sheet 5.

J. H. HUNT.
COMBINED ELEVATOR AND DISTRIBUTER.

No. 331,884. Patented Dec. 8, 1885.

Witnesses Inventor
Will R Omohundro James H. Hunt
W. W. Elliott By Jno. G. Elliott
Atty.

(No Model.) 7 Sheets—Sheet 6.

J. H. HUNT.
COMBINED ELEVATOR AND DISTRIBUTER.

No. 331,884. Patented Dec. 8, 1885.

Witnesses. Inventor.
James H. Hunt
By Jno. G. Elliott
Atty.

(No Model.)  7 Sheets—Sheet 7.

J. H. HUNT.
COMBINED ELEVATOR AND DISTRIBUTER.

No. 331,884.  Patented Dec. 8, 1885.

Witnesses  
Will R. Onohundro  
W. W. Elliott

Inventor  
James H. Hunt  
By Jno. G. Elliott, Atty.

N. PETERS, Photo-Lithographer, Washington, D. C.

UNITED STATES PATENT OFFICE.

JAMES H. HUNT, OF CHICAGO, ILLINOIS.

COMBINED ELEVATOR AND DISTRIBUTER.

SPECIFICATION forming part of Letters Patent No. 331,884, dated December 8, 1885.

Application filed October 20, 1885. Serial No. 180,411. (No model.)

*To all whom it may concern:*

Be it known that I, JAMES H. HUNT, a citizen of the United States, residing in Chicago, county of Cook, and State of Illinois, have invented certain new and useful Improvements in Combined Elevators and Distributers, of which the following is a specification.

This invention relates to improvements in combined elevators and distributers especially designed for delivering ear-corn from a dump to one or more cribs at any reasonable distance therefrom, or for likewise elevating and distributing other materials—such as coal, potatoes, and grain of various kinds—when otherwise much valuable time and expense would be involved by the necessity of having to shovel the materials one or more times.

The prime object of this invention is to automatically elevate and distribute ear-corn from a dump into the crib, and by a simple and effective power of mechanism hereinafter described.

A further object of this invention is to have the distributing-cars automatically locked in their operative position to receive the grain, and to when loaded unlock themselves, move forward to their point of delivery, and automatically deliver their load. A further object is to provide for such a connection between the cable-winding drum, the actuating mechanism thereof, and the cars that after the cars have distributed their load the drum will be automatically reversed and return the cars to their loading position; to provide such a connection between the cars and the winding-drum thereof that when the cars are in position to be loaded the drum will be automatically disconnected from the actuating mechanism, and in condition to be actuated by the car alone when in transit to its destination; to have such connection between the sectional tracks on which the cars are respectively loaded that the weight of the car being loaded will cause a lock in the sectional track of the other car, so as to prevent said other car from leaving its tilting track-section until the loaded car has moved off its sectional track, distributes its load, and returns to its track-section. A further object is to have such a connection between a supplemental delivery-chute and the cars that such chute will automatically deliver the materials to be distributed on both sides of the main chute, but only on a side where a car is in a loading position. A further object is to provide a dump with an effective and automatically-actuated means for successfully delivering ear-corn to the elevator, and overcome any tendency of the corn to clog in the dump or at the receiving end of the elevator. These and other objects hereinafter described are attained by devices illustrated in the accompanying drawings, in which—

Figure 2:
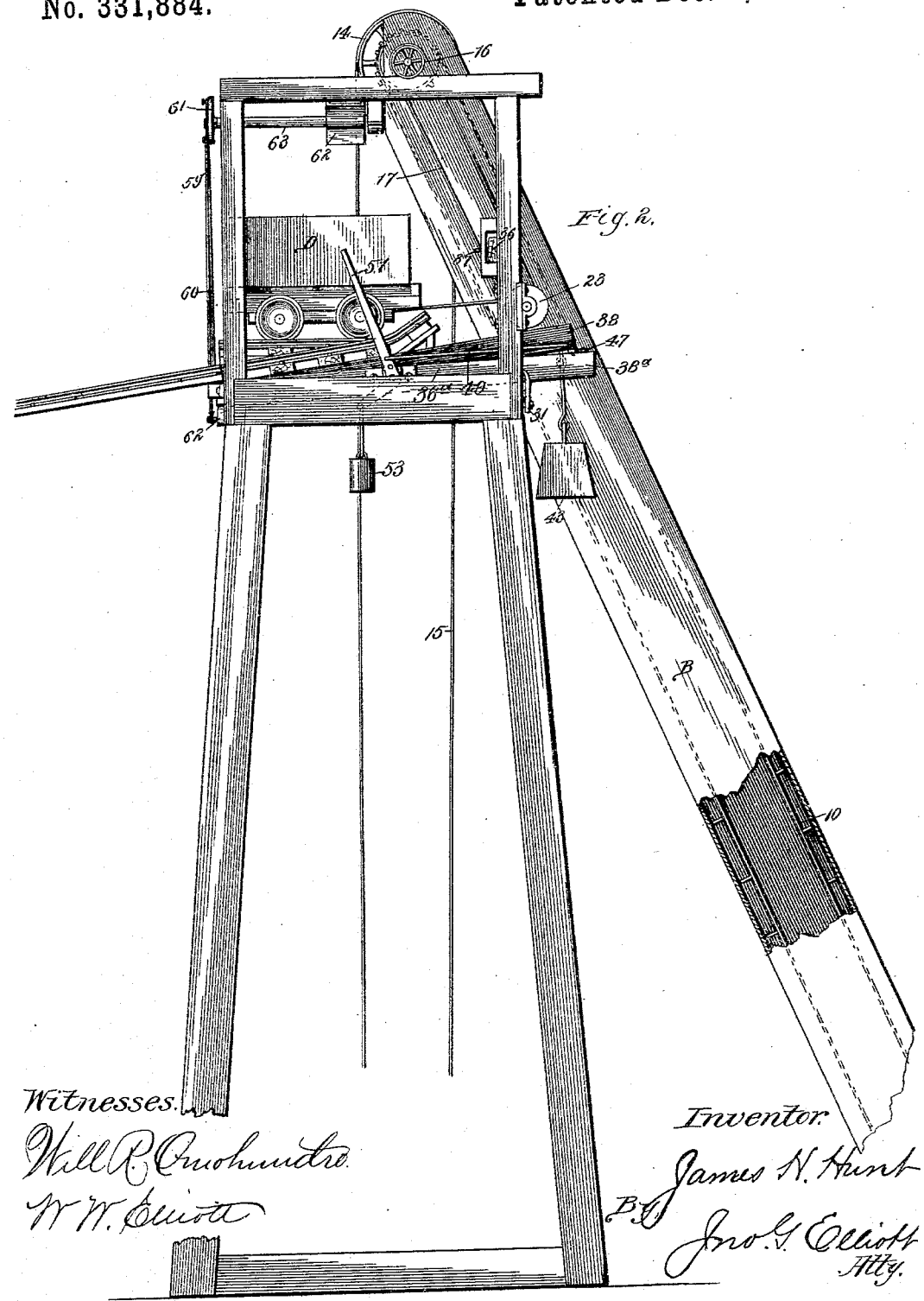
Figure 3:
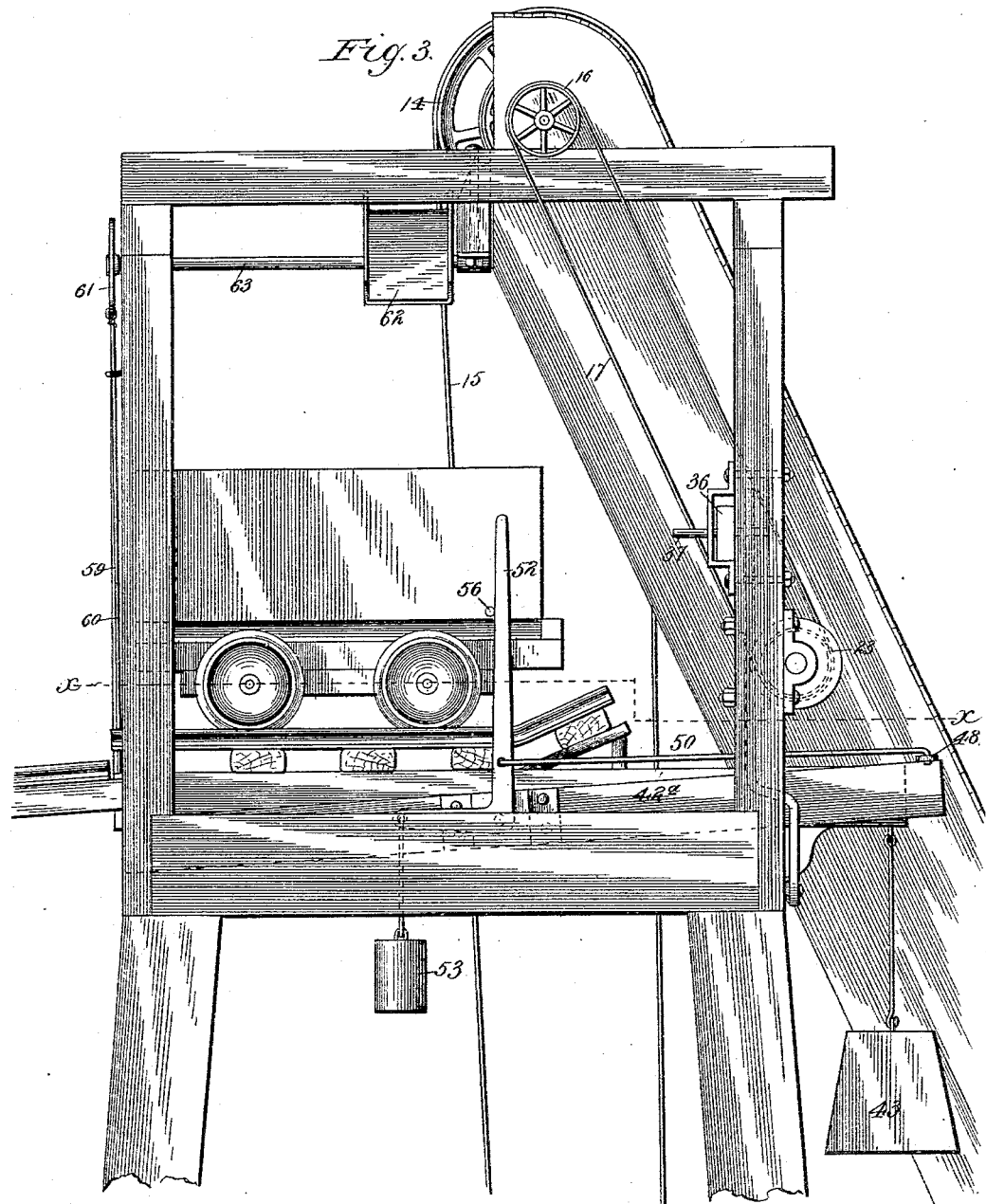
Figure 4:
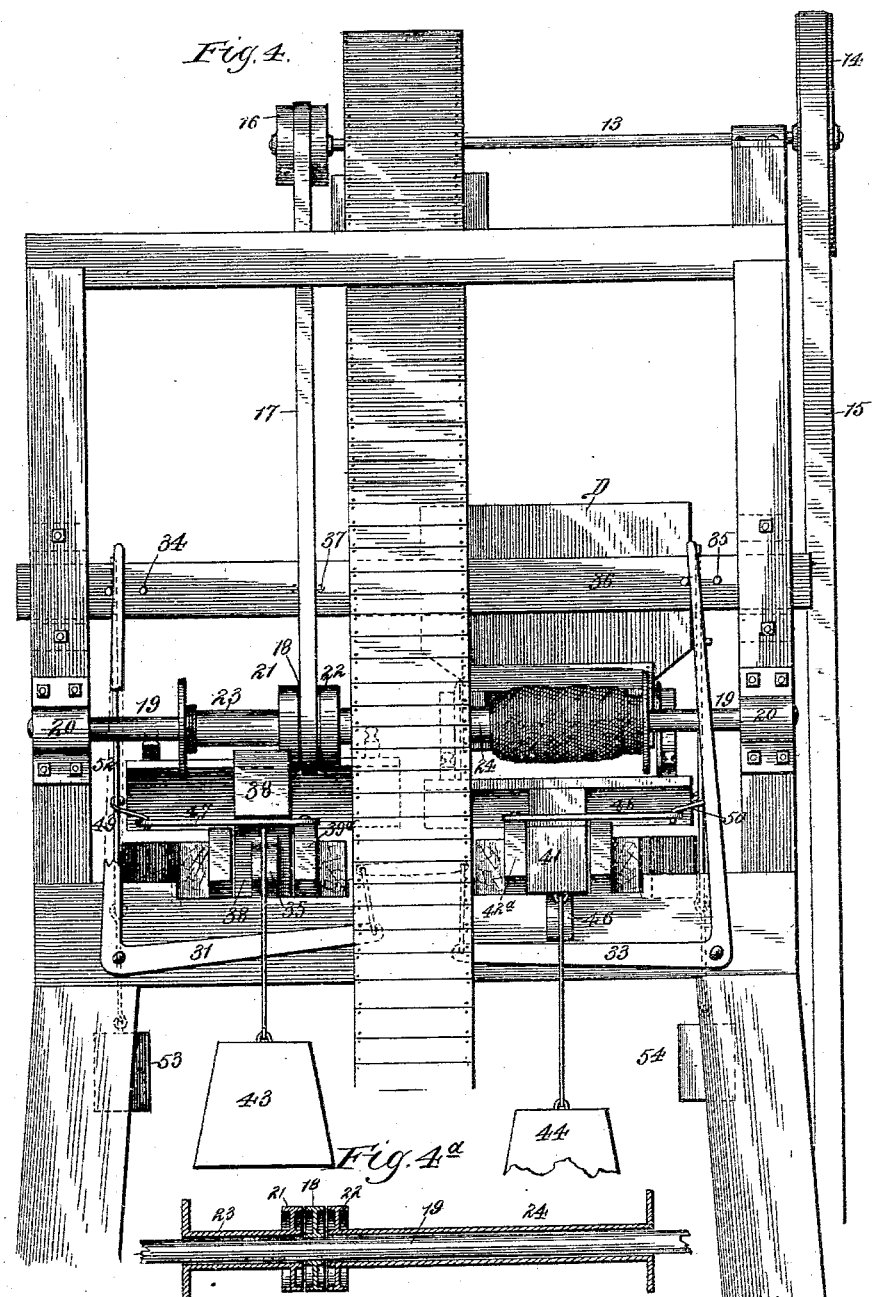
Figure 5:
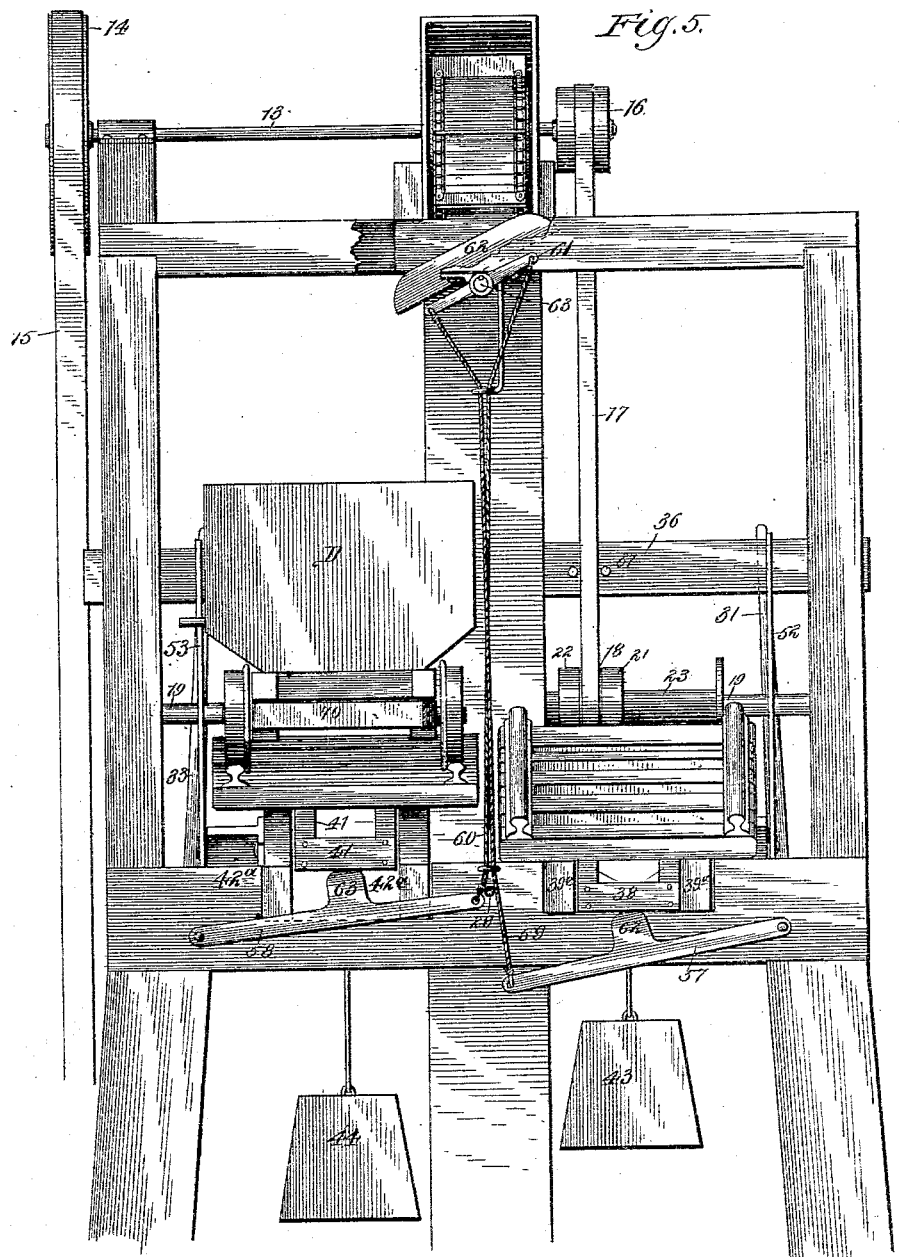
Figure 6:
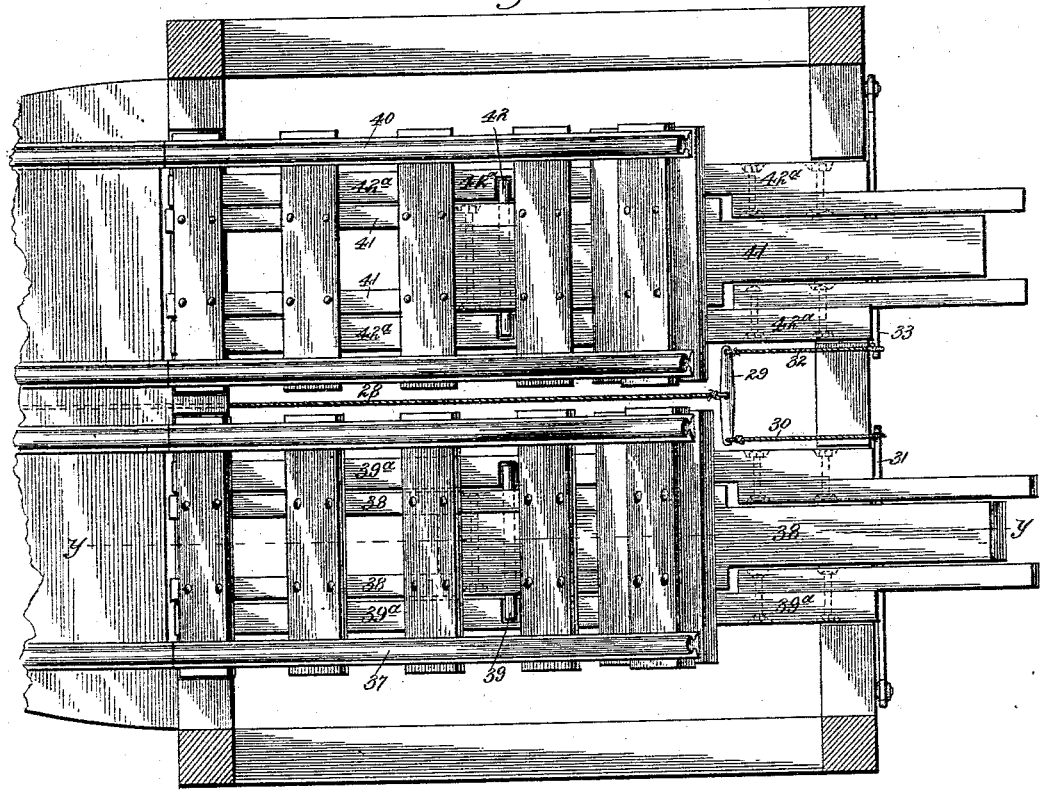
Figure 7:
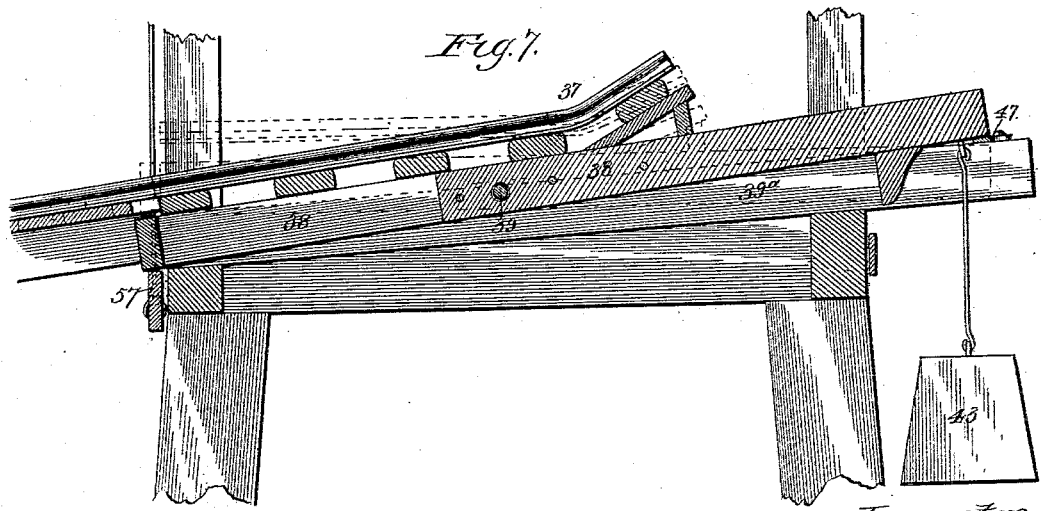
Figure 8:
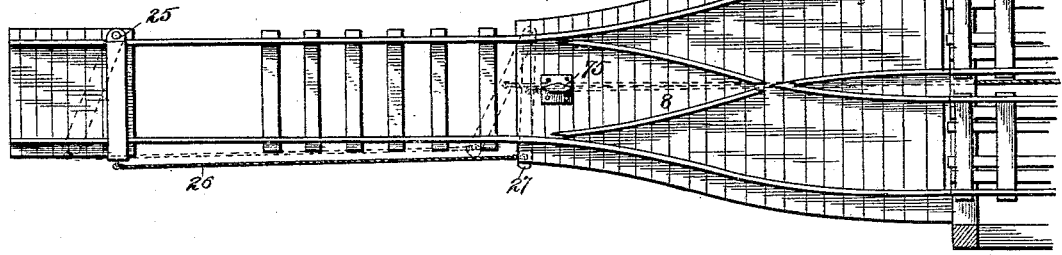
Figure 9:
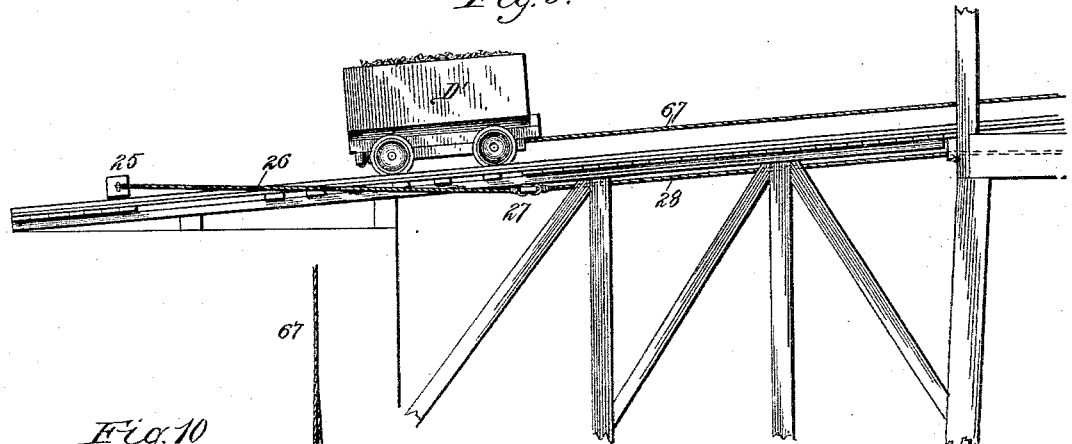
Figure 10:
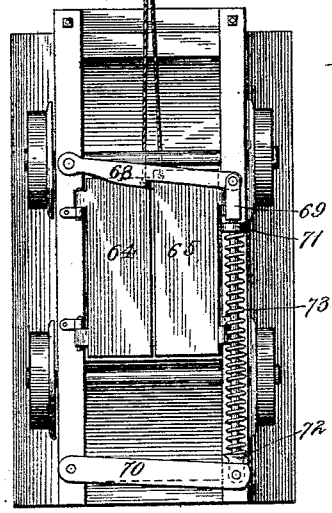
Figure 11:
Figure 12:
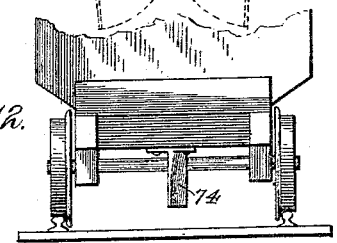

Figure 1 illustrates a perspective view of the elevating and distributing apparatus in operation involving my invention; Fig. 2, a side elevation, partly in section, of the elevator and one of the delivery-cars in its operative position on the farther track to receive a load; Fig. 3, an enlarged detail side elevation of the same with the near car in position to receive a load and in position to overcome the weight of and maintain the long arm of the locking bell-crank in an operative position; Fig. 4, an enlarged detail rear elevation of the device shown in Fig. 2; Fig. 4ª, a longitudinal section through the thick pulleys of the winding-drums and the intermediate loose pulley; Fig. 5, an enlarged detail front elevation of the device, shown in Fig. 4; Fig. 6, a horizontal section on the line *x x*, Fig. 3; Fig. 7, a vertical section on the line *y y*, Fig. 6; Fig. 8, a detail plan view of and mainly showing the fixed trackways and the cord and lever connections by means of which the belt is shifted upon the fixed and loose pulleys of the winding-drum; Fig. 9, a side elevation of device illustrated in Fig. 8 with an addition to a car in transit to deliver its load; Fig. 10, a bottom plan view of one of the cars; Fig. 11, a transverse section through one of the cars, with dotted lines indicating the gateways thereof swung open; Fig. 12, an end elevation of one of the cars; Fig. 13, a top plan view of the bottom of the dump; Fig. 14, an enlarged detail section of the same and of the adjacent end of the elevator, showing the relative position thereto, vibrating the endless bottom of the drum; Fig. 15, a modification of the locking-lever at the forward ends of the tilting track-sections.

Similar letters of reference indicate the same parts in the several figures of the drawings.

The construction and operation of my elevator and distributer, described in a general way and by reference to Fig. 1, is as follows: The loaded wagon is driven upon the usual tilting or inclined platform, and its contents discharged in a dump, A, from which ear-corn or other materials are moved by the elevator B, the upper end of which is supported on an elevated frame or tower, C, and discharges into a suitable chute for directing the corn into the car D while the car D' is distributing its load along the incline track E, supported above a series of cribs, F, provided with openings F' at the apices of their roof. The details of construction of these cribs are not herein claimed, and form a part of a separate application to be hereafter filed; but so far as this invention is concerned any form of crib provided with a door in or near its roof will subserve the purpose of my present invention.

The elevator and the drum and other mechanisms for the cars may be actuated by any ordinary horse-power machine, G, or by any other suitable or convenient mechanism. By these means no shoveling of the materials is required, and the grain may be automatically elevated from the dump and distributed to any number of cribs within a reasonable distance of the elevator. More specifically described, the dump is provided with inclined ends 1 1, between and connecting which (see Figs. 13 and 14) are parallel bars 2, between which travel a series of blocks, or may be teeth, 3, secured upon an endless apron, 4, traveling upon pulleys 5 6, one of which, 5, has its shaft connected in any convenient manner with the actuating mechanism of the elevator. The pulley 6 is journaled in the frame 7, which shaft is pivoted at one end upon the shaft of the pulley 5, or may be at a point forward thereof, and at its opposite end is connected with the weight 8 by a cord passing from a pulley at an elevation above the frame, so that when there is sufficient corn or other material on the apron to overcome the weight one end of this frame will descend to the position indicated in dotted lines in Fig. 14, and its teeth or blocks at this end be lowered below the plane of the bar. This construction of the dump provides for drawing the corn only from the forward end thereof into the feed-passage 9 of the elevator, and particularly at a time when the dump is pretty well filled, and yet enables the entire contents of the dump to be discharged into said passage; or, in other words, when the elevator is well filled with corn the weight of the same overcomes the weight 8 and presses the teeth or blocks of the carrier below the bars 2, so that only the teeth next the feed-passage engage and carry the corn forward. Without this vibrating movement of the carrier the teeth thereof would necessarily engage and be compelled to force the entire bottom layer of corn against the resistance or weight of the entire bulk, which would not only require considerable power, but not afford an effective delivery of the corn to the elevator. The elevator B has its chain 10, carrying the buckets 11, running upon a loose pulley, 12, at its bottom, and at its upper end (see Fig. 5) on the usual pulley on a shaft, 13, which is the power-shaft of the machine, and carries at one end a large pulley, 14, connected by the belt 15 with the power-supplying machine, and at its opposite end with the pulley 16, on which is a belt, 17, (shown in Fig. 5,) working upon a loose-pulley, 18, (see Fig. 4ª,) sleeved on a transverse shaft, 19, extending transversely of the elevated structure, and journaled at each end in suitable boxes, 20, secured on the uprights thereof. Next and on each side of this loose pulley are pulleys 21 and 22, the first of which is rigid upon a drum, 23, and the other upon a drum, 24, sleeved upon the shaft 19, which last drum has a hub-extension, on which the pulley 21 is secured. These drums are connected with their respective cars D D' by cables, which are of sufficient length when unwound from the drum to permit the cars to deliver their contents at the desired distance from the elevator, and are alternately actuated by shifting the belt 17 from one of the fixed pulleys to the other, or are both disconnected from the belt by shifting the belt upon the loose pulley 18. When a car is loaded and has passed off the track-section hereinafter described, the belt 17 is upon the loose pulley or upon a fixed pulley on the drum, as the case may be, and the drum moving car is free to rotate on the shaft 19 and have its cable unwound as the car advances to its destination. After the car has delivered its load its drum is automatically actuated to wind up the cable and return the car for another load by means of a belt-shifter actuated by the momentum of the car about the moment it reaches its destination. The shifter consists of several parts—namely, a bar, 25, extending transversely across the trackway and pivoted at one end thereto, with its other end connected by a cable, 26, with one end of a similar bar, 27, likewise pivoted, but upon the under side of the track, to which bar 27, midway its length, is attached a cable, 28. (See Figs. 8 and 9.) At its other end this cable 28 is secured to a bar, 29, (see Fig. 6,) having one end, by a cable, 30, connected with one end of a bell-crank lever, 31, pivoted on the outer side of the rear sill of the track-support. (See Fig. 4.) The other end of the bar 29, by cable 32, is likewise attached to a bell-crank lever, 33, pivoted to the sill in the same manner as the lever 31. Upright arms of the bell-crank levers 31 and 33, respectively, engage studs 34 35 toward opposite ends of a shifting-bar, 36, between guide-pins or a staple, 37, of which the belt 17 is directed, and which, when actuated by the bell-crank levers, shift the belt from the fixed pulleys 21 22 to the loose pulley 18, or vice versa. Bar 29 is suspended by the several cables 28, 30, and 32, and when one of the bell-crank levers 31 or 33 is held rigid, as hereinafter described, the strain of the cord 28 will actuate only the other and unlocked bell-crank lever, and shift the belt accordingly from the loose pulley to one of the fixed pulleys of the drum. If, for instance, the lever 33 is locked, as shown, and hereinafter described, in Fig. 4, and the car on the track next the bell-crank lever 31 engages its respective bar 25 at the delivering end, the cord 28 will actuate and elevate the cord-connected end of the bell-crank lever 31, shift the bar 36 to left in said figure, and the belt from the loose pulley 18 to a fixed pulley, 21, and as the belt is always in motion the result will be to wind the cable of the car upon the drum and return the car to its position for loading. When in position for loading, the cars rest upon a track-section, 37, supported upon a vibrating beam, 38, transversely pivoted on a shaft, 39, journaled in parallel fixed sills 39$^a$. The next and parallel track-section, 40, for the second car is supported on a beam, 41, which, like the section 38, is pivoted on a shaft, 42, journaled in fixed sills 42$^a$, the relative positions of the shafts 39 and 42 to the car, and therefore the axes upon which these track-sections vibrate, are at a point rearward of the center of length, and hence the center of gravity of the cars. To the rear end of the vibrating beams (see Fig. 7) are attached weights 43 44 sufficient to tip the ends of the track-section above the adjacent ends of the main track and maintain said ends in that position until the cars are substantially loaded, when the weight of the load will lower the forward end of the track-section and align it with it so that the car may pass upon the main track. Rigid on the under side of and toward the rear ends of the tilting beams 38 41 are stud-blocks 35 and 46, which, when the rear ends of said beams are tilted to their lowest position, engage the horizontal arms of the bell-crank levers 31 and 33, respectively, locking said levers against any tendency to actuate the shifting-bar 36; but in this connection it should be stated that, as hereinafter described, both of said levers are never locked at the same time and only when a car is delivering or on one of the tilting track-sections receiving its load. The rear ends of the tilting beams are prevented at the proper time from descending, and are therefore locked in an elevated position, by means of bars 47 and 48, respectively, so pivoted at their inner ends on the upper edge of inner sills, 39$^a$ and 42$^a$, that they may be swung upon their pivots both in and out of the path of the rear ends of the said sills. At their outer ends these bars are connected by links or rods 49 and 50 (see Figs. 2, 3, and 4) with the long arm of bell-crank levers 51 and 52, respectively, arranged on the outside of the parallel tilting track-sections, (see Figs. 2 and 3,) and pivoted to the fixed sills 38$^a$ and 42$^a$.

To the short arms of bell-crank levers 51 and 52 are attached weights 53 and 54, which, when said levers are not engaged by a car, maintain the levers in the forward position shown in Fig. 2, and the bars 47 and 48 out of the path of the tilting-beams; but when a car is backing upon the tilting track-section these levers are respectively engaged by pin or stud projections 55 and 56, respectively on the the cars D and D' in such a position that after the cars are on the track-sections and moving toward the rear end thereof the pins will engage and carry the long end of the levers rearward against the resistance of their weight, and forcing the bars 47 and 48 out of the path of the tilting-beams, and permitting the track to tilt the moment the center of gravity of the car is rearward of the axis of the tilting track. As the loaded car by its weight elevates the rear end of the track-section, and moves forward off the tilting track-section, the weight on the short arms causes the long arms of the bell-crank levers to move forward, and carrying with them bars 47 and 48 in the path of the tilting-beams, as shown in Fig. 2, thereby locking the beam off which the car has just passed until said car has distributed its load, returned on the track-section, and engaged and actuated the bell-crank lever to throw the locking-bar out of the path of the beam. The lever and the locking-bar are actuated by the car before its center of gravity has passed rearward of the axis of the the tilting track section, and hence the locking-bar is forced out of the path of the beam before its rear end begins to descend.

In order to avoid collisions upon the track, and in view of the fact that the independent drums of both cars are actuated by the same belt, it is important that the car being loaded shall not leave its track-section until the other car shall have distributed its load and returned to its track-section, notwithstanding the fact that the car being loaded has sufficient gravity to tilt its track-section and move forward upon the main track. To these ends are pivoted at one end on transverse sills forward of the track-section levers 57 and 58, to the inner and free ends of which are respectively attached the cords 59 and 60, secured at their upper ends to the extremities of a centrally-pivoted bar, 61, (see Fig. 5,) and guided in suitable eyebolts for maintaining them out of the path of the cars, above which they rise. Lever 57 has centrally of its length a lug or projection, 62, for engaging the tilting-beam 38, and lever 58 likewise a projection, 63, for engaging the beam 41, and these levers are actuated by the beams themselves, as will now be described. As the forward end of the track-section of the beam 38 is tilted downwardly by the car moving forward to deliver its load the beam 38 engages the projection 62 and depresses the lever 57, which by the connection before described elevates the lever 58 and its stud against the elevated forward end of the tilting-beam of the opposite track-section. In passing off its tilting track-section the car releases the lever 49, and hence the bar 47 is swung upon its pivot and locks the rear end of the beam 38 in its resultant elevated position until the car has distributed its load and unlocked its track-section. From the time the car has left its track-section until it has returned the lever 58 has locked the forward end of the beam 41 in an elevated position, notwithstanding that sufficient material may have accumulated in its car D to otherwise lower said forward end. If such a load has accumulated in the car D by the time the car D' has returned upon and locked its pivoted track-section, the car will immediately tilt its section, and move forward to distribute its load, when precisely the reverse operation of the several parts will take place, and the car D' will be loaded and the forward end of its track be maintained in an elevated position until the car D returns and unlocks its track-section. It is proposed that the cars shall have such a capacity and that their relative positions and the axes of their track-sections shall be such that the receiving-car shall not be overloaded before the delivery-car has returned to its loading position, and that the swinging chute 62, alternately loading both cars, shall not direct its contents to the empty car until the loaded car is moving forward to deliver its load. Chute 62 is supported by and centrally pivoted upon a shaft, 63, (see Fig. 5,) to the projecting end of which the bar 61 is secured, and hence is actuated by the cable and lever connection with the beams, so as to direct the materials delivered from the car locked on its pivoting track-section; but as soon as this car moves off its section the chute is actuated by the cable and lever connections and swung upon its axis so as to make a delivery into the car just returned on the other section the moment the other car moves forward to deliver its load, and by these means the chute is rendered automatic in its operation. In this connection it is proper to observe that the rear ends of the rails of both of the pivoting track-sections are bent upwardly, so as to limit the backward movement of the cars without suddenly stopping and jerking them; but instead of so bending the rails each track-section may be so provided with any desirable form of bumper, yielding or otherwise.

To promote the effectiveness and efficiency of this elevator and distributer, it is important that the cars should distribute or deliver their load at the proper time and place, and to this end the bottom of each car is provided (see Figs. 10 and 11) with doors 64 and 65, respectively, hinged at their outer side edges to the under sides of the side sills of the car, so as to swing downwardly when opening to discharge the contents of the car, and it is to these doors that the cable 67 of the winding-drums are attached, so that after delivering a load the strain of the cable will elevate and close these doors. The doors are automatically locked in a closed position by means of a spring-actuated vibrating frame pivoted to one side of the sills of the car, and consisting of a locking-bar, 68, pivoted at one end to said side sills, so that it may be swung in and out of the path of the doors to permit them to open or to lock them when in a closed position against the weight of the contents of the car. The opposite end of this locking-bar 68 is pivoted to a rod or bar, 69, at its opposite end pivoted to link 70, in turn pivoted at its other end to the sill of the car. The bar or rod 69 works freely in a lug, 71, rigid on the opposing side of the sill of the car, and impinging between a shoulder, 72, and the lug 71 is a spring, 73, coiled about the rod, and by its action normally maintaining the locking-lever across the path of the hinged doors of the car. When the car moves forward to deliver its load, the link 70 engages the pivoted bar 25 upon the track, and as a result the spring 73 is compressed and the locking-lever swung out of the path of the hanging doors, which by the gravity of the load are forced open and discharge their load, while in the meantime, through the connection of the pivoted bar 25 on the track, the actuating-belt of the drums is shifted and the car begins its backward movement to receive another load, and in this manner both cars are caused to automatically unload and return upon their respective tracks for a fresh load, as already described. When several of the cribs or any one of the number of cribs on the main line of the track are to be loaded, the position of the bar 25 is accordingly shifted as the length of the cable 26 correspondingly lengthens or shortens, the bar 25 being removably pivoted at one end for this purpose.

In order to insure the switching of the cars from the main or swing to their individual or double track, each car may be provided with one or more lugs, 74, (see Fig. 12,) engaging with a stud or projection, 75, (see Fig. 8,) to insure their proper switching; but instead of these lugs any ordinary switch adapted to be automatically actuated by the cars will answer the same purpose.

When the cribs or other receptacles to be filled are all in the same general direction from the elevating structure, as described, the switch and main tracks may be rigidly secured to each other and to the elevating framework; but it is obvious that with a mechanism of construction so simple as that above described the direction of delivery relative to the elevator may be made, and for doing so the track-sections, the drum, and connecting devices be shifted to different sides of the structure, and the switch and tracks be detachably connected together and to the frame and likewise shifted; but in practice this change of direction of delivery may be made by a corresponding curve in the main trackway, though in either case the dump and elevator will remain in their fixed position.

In Fig. 15 is shown a modification of the means before described for locking the tilting track-sections at their forward ends, the same consisting of a single lever pivoted centrally of its length to a cross-beam of the supporting-frame below the forward ends of the track-sections. When this single lever is used, the chute may, if desired, be connected directly with the track-sections, which by their tilting movement will actuate it; or, on the other hand, the chute may have a cord-connection with this single lever, the operation of which is precisely the same as the pair of levers before described.

Having described my invention, what I claim, and desire to secure by Letters Patent, is—

1. The elevator, the trackway, and the cars thereon, in combination with a mechanism, substantially as described, connecting and simultaneously actuating said cars and elevator, substantially as described.

2. The inclined main trackway and the cars, in combination with tilting tracks upon which said cars are supported while receiving their load, substantially as described.

3. The main trackway, the cars, and the winding-drum thereof, in combination with a connection between said trackway and drum, whereby the cars in delivering their load automatically cause the drums to return the cars to a loading position, substantially as described 4. The cars, winding-drums, the cable-connection between said drums and cars, and the belt for actuating said drums, in combination with a belt shifter and a cord and lever connection between said shifter and the main trackway at the point of delivery of the cars, substantially as described.

5. The cars, the winding-drums, the cable-connection between said drum and cars, and a shaft on which said drums are sleeved, in combination with fixed pulleys upon the drum and intermediate loose pulley, an actuating-belt for said pulleys, a belt-shifter, and a cable and lever connection between said shifter and the main track at the point of delivery of the cars thereon, whereby the car in delivering its load will cause the belt to be shifted to the fixed pulley of the drum and the drum to reverse its rotation, substantially as described.

6. The winding-drums, the fixed pulleys thereof, the intermediate loose pulley, the actuating-belt, and the shifting-bar 36, in combination with the bell-crank levers, and the levers 25 and 27, pivoted to the main track and constituting a connection between the lever 27 and the bell-crank levers, whereby one of said bell-crank levers may be actuated independently of the other, substantially as described.

7. The cars and the tilting track-sections thereof, the axis of which track-sections is rearward of the center of gravity of the cars, in combination with locking devices connecting the car with the pivoted track-sections, whereby said track-sections will be locked by the loaded car moving off its track-section, and afterward unlocked by the return of said car in an empty condition, substantially as described.

8. The cars and the tilting track-sections thereof, in combination with the bell-crank levers 52 and 53, a stop-pin on said cars for engaging said levers, the locking-bars 47 and 48, and a connection between said bars and levers, substantially as described.

9. The track-sections, the tilting beams thereof, and the fixed sills on which said beams are pivoted, in combination with the locking-levers 47 and 48, the cars, and a connection between said cars and locking-levers, whereby the latter are swung in and out of the path of the beams, substantially as described.

10. The tilting beams, the track-sections supported thereon, and the pivoted locking-levers 57 and 58 at the forward end of said beams, in combination with a pivoted bar, 61, and a cord-connection between said bar and levers, whereby when one of said levers is depressed the other is elevated, and the track-sections respectively alternately locking and unlocking at their forward ends, substantially as described.

11. The track-sections, the pivoted beams thereof, the bell-crank levers 31 33, and a means for actuating said levers independent of each other, in combination with the locking-bars 47 48 at the rear end of said beams, and the locking-levers 62 and 63 at the forward ends of said beams, substantially as described.

12. The tilting track-sections and the respective cars thereof, in combination with means for alternately locking said track-sections simultaneously at their forward and rearward ends against the tilting movement, and a connection between said cars and locking mechanism, whereby they are automatically actuated by the cars, substantially as described.

13. The tilting track-sections, the cars thereof, the independent drums, a cable-connection between said drums and cars, the fixed pulley on said drums, the intermediate loose pulley, and a means for actuating said pulleys, in combination with a belt-shifting mechanism and a locking mechanism connection and a connection between said belt shifting and locking mechanism and the cars, substantially as described, whereby a car will receive and deliver its load, and after returning to its loading position will be locked until the other car has returned to its tilting track-section after delivering its load, substantially as described.

14. The tilting track-sections and a pivoted chute, in combination with a connection between said sections and chute, whereby the chute is automatically actuated to deliver its contents first into one car and then into the other while in a loading position, substantially as described.

15. The tilting track-sections, the pivoted locking-levers at the forward ends thereof, and the vibrating chute, in combination with a cable-connection between said locking-levers and chute, whereby the chute is automatically actuated to deliver its contents alternately upon opposite sides of its axis, substantially as described.

16. The tilting track-sections, the locking-bars, the locking-levers, and the cars thereof, in combination with a pivoted chute and a connection between said chute and track-sections, substantially as described.

17. In an elevator and distributer, the combination therewith of a dump provided with a vibrating bottom, substantially as described, whereby when the dump is filled the materials will be discharged only at the end thereof next the elevator, substantially as described.

18. In an elevator and distributer, a dump the bottom of which is provided with open parallel bars, in combination with an endless carrier pivoted at one end and counterbalanced at its opposite end and provided with teeth or blocks projecting between the parallel slats, substantially as described.

JAMES H. HUNT.

Witnesses:
W. W. ELLIOTT,
R. C. OMOHUNDRO.